W. NEWBERRY.
STRAW CUTTER.
No. 31,029. Patented Jan. 1, 1861.
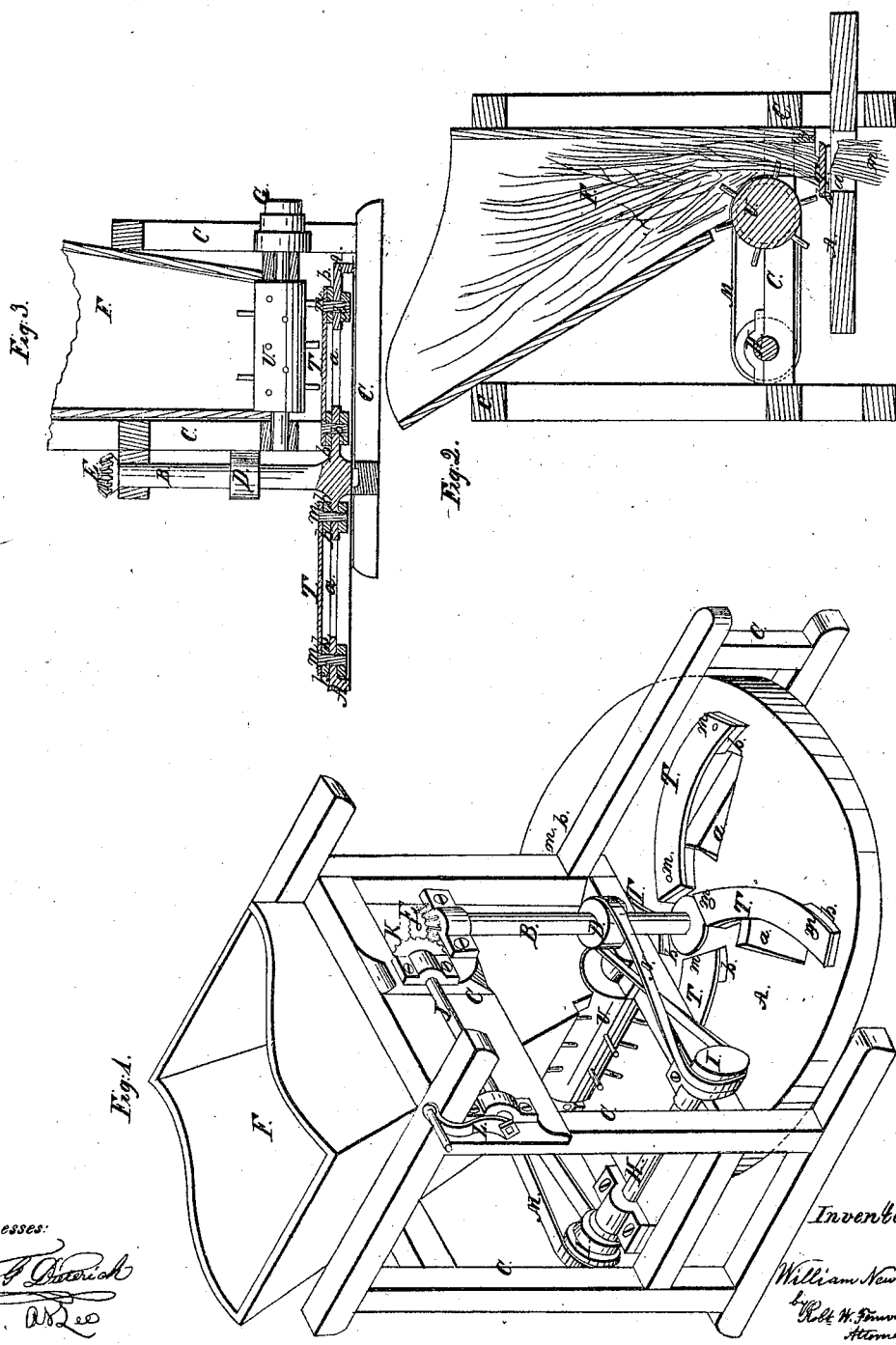

UNITED STATES PATENT OFFICE.

WM. NEWBURY, OF CLARKSVILLE, MISSOURI.

STRAW-CUTTER.

Specification of Letters Patent No. 31,029, dated January 1, 1861.

*To all whom it may concern:*

Be it known that I, WILLIAM NEWBURY, of Clarksville, in the county of Pike and State of Missouri, have invented a new and useful Improvement in Straw-Cutters; and I do hereby declare that the following is a full, clear, and exact description of the same, reference being had to the accompanying drawings, forming a part of this specification, in which—

Figure 1 is a perspective view, and Fig. 2, a vertical transverse section of my invention, and Fig. 3, a vertical longitudinal section of the same.

Similar letters of reference in each of the figures indicate corresponding parts.

The nature of my invention consists, 1st, in the combination of one rake toothed feed roller, a vertical hopper, a series of revolving knives a horizontal gage plate and certain gearing, the whole constructed, arranged and operating in the manner and for the purposes described.

It consists, 2nd, in the combination of the separate or removable projections on which the knives rest, screws, knives and horizontal gage plate, in the manner hereinafter set forth; whereby the knives may be adjusted higher or lower relatively to the gage plate, and when thus adjusted have a firm and broad foundation to rest upon; instead of being simply supported by set screws. The removable projections also prevent clogging of the straw around about the set screws.

My arrangement constitutes a very simple and accurately operating straw cutter, and yet but one feed roller is necessary in its construction. In straw cutters of this character, as will be seen by referring to Darius Babcock's patent of 1858, two feed rollers have been operated by ratchets and pawls have been used to control the passage of the straw to the knives. The necessity for using two rollers arises from there being no gage plate for the straw to rest upon during the approach of the cutters to the point where the cutting takes place, and of the straw, in order to be accurately cut, requiring to be held in suspension between the two rollers.

To enable others, skilled in the art, to make and use my invention, I will proceed to describe its construction and operation.

A, represents a circular horizontal plate having four or more straw escape passages *a, a,* cut vertically through it and also carrying upon its upper surface, four or more curved knives T, which are mounted upon separate projections *b, b,* so as to rest above and partly overhang the passages *a, a,* as represented. The knives and projections being fastened by screws *m,* they can be adjusted so as to cut the straw shorter or longer by simply taking off the nuts of the screws, lifting up the knives with the screws attached and substituting thicker or thinner projections for those last in use. The plate A, is attached centrally to a vertical shaft B, which is arranged to revolve in bearing boxes of a strong frame C. At a point midway of the shaft, a pulley D, is placed and to the top of the shaft a toothed bevel wheel E, is attached as shown.

F, is a vertical hopper with one of its sides inclined. This hopper is arranged within the frame C, so that its lower end is slightly above the gage plate A. A little in rear of the center and near the bottom of the hopper, and just above the gage plate, one feed roller U, furnished with long rake teeth is arranged. The journals of this roller rest upon the frame A, and has secured on one of its ends, a cone of pulleys G, as represented.

H, is a counter shaft furnished at each end with a pulley I.

J is a driving shaft supported on the frame A, and having on one of its ends, a bevel wheel K, which gears with the bevel wheel E, and on its other end a crank L.

M, N, are belts for transmitting the motion from the driving shaft to the several parts of the machine.

The operation is as follows: The straw is placed in an inclined position in the hopper, and the machine operated by turning the crank. As the feed roller revolves, its teeth rake down the straw and cause its ends to rest upon the gage plate. As fast as this occurs, the knives of the gage plate come around to the throat plate *y,* and cut off that portion of the straw which is below their edges. The straw, as fast as cut, finds a ready escape through the vertical passages, *a,* of the gage plate. If it is desired to cut finer or coarser, the nuts of the screws *m,* are taken off and the screws with the knives raised so that the projections which support the knives may be removed and others, either thicker or thinner, accordingly as the necessity of the case may demand, substituted therefor.

If it is desired to increase the speed of the feed roller and diminish that of the cutters, or vice versa, the belt M, is shifted from one set of pulleys to another, accordingly as the necessity of the case may require.

What I claim as my invention and desire to secure by Letters Patent, is—

1. The combination of one rake toothed feed roller U, a vertical hopper F, a series of revolving knives T, T, a horizontal gage plate A, and the gearing D, B, E, K, J, G, I, M, N, the whole constructed, arranged and operating in the manner and for the purposes herein set forth.

2. The combination of the separate or removable projections $b$, $b$, on which the knives rest, set screws $m$, knives T, T, and horizontal gage plate A, in the manner and for the purposes set forth.

WM. NEWBURY.

Witnesses:
 SAM'L. C. SMITH,
 DANIEL DOUGLASS.